United States Patent Office 3,516,975
Patented June 23, 1970

3,516,975
ETHYLENE-VINYL ACETATE POLYMERS PREPARED WITH POLYOXYALKYLENE COMPOUNDS
Edmund R. Meincke, Cuyahoga Falls, Ohio, assignor to The General Tire & Rubber Company, a corporation of Ohio
No Drawing. Continuation-in-part of application Ser. No. 744,654, July 15, 1968. This application Oct. 25, 1968, Ser. No. 770,804
Int. Cl. C08f 1/09, 15/02
U.S. Cl. 260—80.8                    14 Claims

ABSTRACT OF THE DISCLOSURE

Interpolymers of ethylene and vinyl acetate, which may contain small amounts of other copolymerized material, e.g., acrylic acid, are improved in tensile strength and caused to have higher molecular weight by incorporating progressively as the polymerization proceeds into the monomer system a small amount, e.g., about 1 to 5% by weight, based on 100 parts by weight total of the ethylene and vinyl acetate, of a water-soluble polyoxyalkylene compound containing at least 15 oxyethylene units, e.g., polyethylene polyols or ethers of polyethylene polyols and the like.

CROSS-REFERENCE TO RELATED APPLICATION

This application is a continuation-in-part of prior copending patent application Ser. No. 744,654, filed July 15, 1968, and entitled "Methods of Producing Improved Ethylene-Vinyl Acetate Interpolymers and Resulting Products" (now abandoned).

BACKGROUND OF THE INVENTION

Field of the invention

The copolymerization of ethylene and vinyl acetate presents difficulties because of the property of polymer chains made up of ethylene to lose free radical activity to any material with a labile hydrogen. As a result, the molecular weight may be so low that the polymer has very little strength. While polymer chains of other monomers will lose their activity to very active chain transfer agents such as mercaptans or chlorinated compounds, those with ethylene chains terminate in the presence of surfactants, vinyl acetate, etc. One method to counteract this is the use of cross-linking agents. Usually, cross-linking is accomplished by using difunctional monomers such as divinyl ether or ethylene glycol dimethacrylate. However, these are expensive, and because of their low molecular weight, produce short cross-links between the polymer chains which produce polymers with poor extensibility.

Description of the prior art

Polyethylene glycol ethers, as represented by the alkyl phenyl mono-ethers which are used as surfactants, are known to react with growing polyethylene polymer chains and become a part of the polymer. Mantell et al. (cf. "J. Applied Polymer Science," 10, 1845) found that as much as 4% of polyether could be incorporated in the polymer chain. However, no increase in molecular weight, due to the presence of these surfactants, was reported.

U.S. Pat. No. 3,226,352 discloses that surfactants with less than 15 polyoxyethylene groups may be used in the production of soluble polyethylene latices. German 1,223,557 covers the preparation of polyvinylacetate emulsions using $C_6$ to $C_{22}$ alkyl monoethers of polyethylene glycol with 10 to 30 oxyethylene units. The latices formed are thixotropic and no mention is made of the molecular properties of the polymer formed.

OBJECTS

A principal object of the present invention is the provision of improvements in methods for the production of ethylene-vinyl acetate interpolymers. Further objects include the provision of:

(1) Improved interpolymers of ethylene and vinyl acetate having higher molecular weight and better tensile strength than can be obtained by the conventional methods employed in the copolymerization of vinyl acetate and ethylene.

(2) Improved ethylene-vinyl acetate copolymers particularly useful in making paints for interior or exterior use, formulation of adhesives, and preparation of coating compositions for paper and other substrates.

(3) Information on how the molecular weight and tensile strength of ethylene-vinyl acetate copolymers may be increased using only very small amounts of readily available reagents to modify the copolymerization of ethylene and vinyl acetate.

(4) Improved methods for obtaining high molecular weight and improved tensile strength ethylene-vinyl acetate copolymers which may contain small amounts of other copolymerized materials such as vinyl chloride, acrylic acid esters, unsaturated monocarboxylic acids and the like.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description. It should also be understood the foregoing abstract of the disclosure is for the purpose of providing a non-legal brief statement to serve as a searching-scanning tool for scientists, engineers and researchers and is not intended to limit the scope of the invention as disclosed herein nor is it intended it should be used in interpreting or in any way limiting the scope or fair meaning of the appended claims.

SUMMARY OF THE INVENTION

These objects are accomplished according to the present invention through the copolymerization of ethylene and vinyl acetate to produce polymer products of high molecular weight and improved tensile strength which comprises:

(a) Polymerizing a monomer mixture of ethylene and vinyl acetate as a disperse phase in an aqueous medium wherein at least one of the components ethylene or vinyl acetate is introduced into the aqueous medium progressively as the polymerization proceeds, and (b) Including as a component of the monomer mixture a minor amount of a water-soluble polyoxyethylene compound by progressive addition as the polymerization proceeds, (c) Said polyoxyethylene compound having from 2 to 8 terminal —OR groups wherein R is hydrogen, C1 to C10 alkyl or C6 to C18 aryl, and from 15 to 100, preferably 15 to 50, oxyethylene units.

In a preferred embodiment of the invention, the polyoxyalkylene compound is polyethylene glycol or an ether of polyethylene glycol. Advantageously, such compound contains 15 to 30 oxyethylene units.

The new polymerization methods are advantageously applied to the polymerization of monomer mixtures containing from about 25 to 10 parts by weight of ethylene and from 75 to 90 parts by weight of vinyl acetate. Such monomer mixtures may in addition contain up to about 10 parts by weight of other copolymerizable material and in a preferred embodiment the monomer mixture will comprise up to about 2 parts by weight of acrylic acid or other copolymerizable unsaturated carboxylic acid monomer for each 100 parts by weight of the monomer mixture.

Advantageously one employs between 1 to 5 parts by weight of the polyoxyethylene compound based upon the combined weight (100 parts) of ethylene and vinyl acetate used in the polymerization. Further, one preferably employs an ionic emulsifying agent and a peroxygen or redox polymerization catalyst dissolved in water as the aqueous medium in which the monomer mixture is introduced as a disperse phase in conducting the polymerization. Advantageously the polymerization is conducted at a temperature at least above the freezing temperature of the aqueous media and from above about 1 to 50° C. for between about 5 to 10 hours or more depending on the desired conversion with a view to obtaining a polymer product possessing a gel content of at least 25% and up to a possible 100% and an inherent viscosity of at least 1.0.

EXAMPLES

The following details of operations in accordance with the invention and reported data illustrate the further principles and practice of the invention to those skilled in the art. In these examples and throughout the remaining specification and claims, all parts and percentages are by weight unless otherwise specified.

Example 1

An aqueous solution was prepared from the following ingredients in the parts indicated:

|  | Parts |
|---|---|
| Water | 1197 |
| Ammonium persulfate | 3.75 |
| Sodium acetate | 7.5 |
| Hydroxy ethyl cellulose (1) | 3.0 |
| Sodium dimethylamyl sulfosuccinate (2) | 4.8 |

This solution was charged into a polymerization vessel equipped with internal agitator, pressure-tight closure, heating mantel and valved fluid inlets. The closure was then clamped in position and the vapor space purged once with nitrogen gas. The agitator was then set in motion and the vessel pressurized with nitrogen to 25 p.s.i.g. Next, 150 parts of vinyl acetate monomer were pumped in followed by the following aqueous solution:

|  | Parts |
|---|---|
| Water | 15 |
| $FeSO_4 \cdot 7H_2O$ | 0.15 |
| Rochelle salt | 1.5 |
| SFS (3) | 0.375 |

The internal pressure was then raised with ethylene to 150 p.s.i.g. and charging of ethylene to the vessel was continued for the remainder of the polymerization at a rate required to maintain an internal vessel pressure of 150 p.s.i.g.

After 1 hour of reaction under constant agitation, addition of equal portions of a mixture of 1327.5 parts of vinyl acetate and 22.5 parts of acrylic acid was commenced at a rate to require 6 hours for the introduction of the entire amount of the mixture into the vessel. During this 6-hour period, 12 parts of the following solution were added every one-half hour:

|  | Parts |
|---|---|
| Water | 180 |
| $Na_2CO_3$ | 7.5 |
| SFS | 2.25 |

The following solution was also added in increments during this 6-hour period:

|  | Parts |
|---|---|
| Water | 30 |
| Ammonium persulfate | 1.0 |
| Sodium diamyl sulfosuccinate (4) | 1.0 |

One-half was added after 3 hours and one-half after 5 hours.

At the end of 7½ hours, the vessel was vented to atmosphere, after shutting off the flow of ethylene, and the resulting latex was discharged into a storage container. Standard evaluation tests on the polymer latex showed the polymer to have an inherent viscosity of 0.98 for a 1% solution in methyl ethyl ketone. The percent gel content in MEK was nil.

This operation represented a control polymerization at a temperature of 5° C.

In this example, several of the system components can be further identified as follows:

(1) Commercial product solid as "Cellosize WP–300" in a 2% aqueous solution of which 150 parts were used to provide 3 parts of active agent.

(2) Commercial product sold as "Aerosol MA" (80% solution in water-alcohol mixture).

(3) Sodium formaldehydesulfoxylate.

(4) Commercial product sold as "Aerosol AY."

The resulting co- or interpolymer was analyzed and found to contain (by weight) 82.9% vinyl acetate units, 1.25% acrylic acid units and 15.85% ethylene units (by difference).

Example 2

The procedure of Example 1 was repeated at a temperature of 5° C. with the following exceptions:

(a) The initial charge of vinyl acetate was 75 parts instead of 150 parts.

(b) The vinyl acetate mixture progressively added consisted of:

|  | Parts |
|---|---|
| Vinyl acetate | 1402.5 |
| Acrylic acid | 22.5 |
| Nonyl phenyl ether of polyethylene glycol (5) | 37.0 |

(c) The incremental catalyst solution was added in one-third portions of 15 parts each at 4 hours, 5 hours and 6½ hours and consisted of:

|  | Parts |
|---|---|
| Water | 45 |
| Ammonium persulfate | 1.5 |

(d) The total polymerization time was 8½ hours.

(e) The polymerization was halted by the addition of the following solution:

|  | Parts |
|---|---|
| Water | 18 |
| $Na_3PO_4 \cdot 12H_2O$ | 1.5 |
| Urea | 15.0 |
| Ammonia | 9.0 |

The resulting latex contained a copolymer with a particle size between 1800 to 2600 angstroms. The inherent viscosity (1% in MEK) was 1.40 and the percent gel in MEK was 49.4%.

In this example, the glycol ether (5) is a commercial product sold under the name "Dowfax 9N20" and contains 20 polyoxyethylene units and has a molecular weight about 1040. In place of Dowfax 9N20 a similar product, Igepal CO850, can be used.

The resulting co- or interpolymer was analyzed and found to contain (by weight) 83.5% vinyl acetate units, 1.28% acrylic acid units and 15.12% ethylene and glycol ether units (by difference).

Example 3

The procedure of Example 2 was repeated using in place of "Dowfax 9N20," a variety of other polyoxyethylene compounds as indicated in Table I which also gives inherent viscosity and gel percentage in MEK for the co-polymers obtained with these agents.

TABLE I.—ANALYSIS OF INTERPOLYMER OBTAINED

| Run No. | Polyoxyethylene compound | I.V. | Percent gel |
|---|---|---|---|
| 3A | Nonyl phenyl ether of polyethylene glycol (10EOU) "Tergitol NPX." | 0.98 | None |
| 3B | Nonyl phenyl ether of polyethylene glycol (100EOU) "Igepal CO990." | 2.1 | 76.3 |
| 3C | Polyethylene glycol (13EOU) "Carbowax 600." | 1.95 | None |
| 3D | Polyethylene glycol (30EOU) "Carbowax 1540." | 2.3 | 68.0 |
| 3E | Methyl ether of polyethylene glycol (15EOU) "Methoxycarbowax 750." | 2.1 | 36.0 |

| Percent vinyl acetate | Percent acrylic acid | Percent ethylene and the polyethylene glycol compound (by difference) |
|---|---|---|
| 3A 82.6 | 1.25 | 16.15 |
| 3B 83.2 | 1.27 | 15.53 |
| 3C 83.4 | 1.24 | 15.36 |
| 3D 82.8 | 1.28 | 15.92 |
| 3E 83.1 | 1.25 | 15.65 |

The inherent viscosities reported in the table and elsewhere herein are for a 1% solution of the soluble portion of the polymer in methyl ethyl ketone.

To compare the tensile strengths of some products of Examples 1–3, films of the polymers having an average thickness about 30 mils were prepared. These dried films were then cut to 1 inch width and pulled on a tensile test machine at 1 inch per minute until break. The resulting data are reported in Table II.

TABLE II

| Product | Tensile (p.s.i.) | Modulus | Percent Elongation |
|---|---|---|---|
| Ex. 1 | 515 | 76 | 1,080 |
| Ex. 2 | 1,800 | 180 | 1,070 |
| Ex. 3A | 950 | 125 | 1,000 |
| Ex. 3B | 1,868 | 158 | 695 |
| Ex. 3C | 252 | 74 | 1,170 |
| Ex. 3E | 2,400 | 158 | 1,000 |

The procedure of Example 2 was repeated with the exception that the "Dowfax 9N20" was all added to the aqueous solution at the start of the polymerization, instead of being progressively added with the polyvinyl acetate. The polymer formed was completely soluble in methyl ethyl ketone and had an inherent viscosity of 0.98.

DISCUSSION OF DETAILS

The success of the present invention is due, at least in part, to the discovery that a degree of cross-linking advantageously required to increase the molecular weight of polymers formed by the copolymerization of ethylene with vinyl acetate and to improve the tensile strength of the resulting polymers can be attained without serious detriment to other physical and chemical properties of the polymers using polyoxyethylene compounds as herein defined when such cross-linking agents are incorporated into the polymerization system progressively and preferably at a rate comparable to the rate of the reacting monomers. This has been illustrated by polymerizations in which all of the cross-linking agent was added to the polymerization system at the start of the polymerization while the monomer materials were incorporated at a rate comparable to their rate of reaction. Polymer formed in such manner was found to be completely soluble in methyl ethyl ketone. This solubility is characteristic of the ethylene vinyl acetate copolymer which would be obtained in the absence of the polyoxyethylene compound. In contrast, where the cross-linking agent is added progressively to the polymerization system as the polymerization proceeds, polymer products of substantially increased molecular weight and exhibiting an insolubility of at least 25% in methyl ethyl ketone are obtained. Numerous repetitions of these contrasting operations have established a critical difference in the properties of the polymers obtained on the one hand by gross addition of the polyoxyethylene compound to the polymerization at the start of the procedure as opposed to progressive addition of the cross-linking agent as polymerization proceeds.

The new polymer improvement technique of the invention is contemplated for use generally with ethylene and vinyl acetate copolymerizations using conventional proportions of these reagents in conjunction with conventional catalyst systems employed in the production of aqueous suspension or emulsion polymerizations. Of course, in applying the new technique to known procedures or systems for the copolymerization of ethylene and vinyl acetate, the skilled operator will avoid selection of systems or procedures which would utilize a catalyst or other system component that would be destructive to the polyoxyethylene compound or would be obviously detrimental to the desired performance of this reagent in improving the molecular weight and tensile strength of the resulting polymers in accordance with the intent of the improved procedures. Provided with a disclosure of the new technique for copolymerization of ethylene and vinyl acetate as contained herein, however, the compatibility of the new procedures with any prior known polymerization systems or procedures for the production of ethylene-vinyl acetate co- or interpolymers can be readily determined by conducting a few exploratory runs.

It is clear that an essential reagent in conducting the new polymerization operations is a polyoxyethylene compound. These polyoxyethylene compounds can be prepared by the reaction of ethylene oxide (1,2-epoxyethane) and water as a telogen in the presence of an alkaline catalyst or with a treated double metal cyanide catalyst. Ethylene oxide may also be reacted with methanol, ethanol, butanol, cyclohexanol, nonyl phenol, ethylene glycol, diethylene glycol, butane diol, glycerine, hexane triol, pentaerythritol, pentitol, sorbitol, sucrose, hexitol and other aliphatic hydroxy compounds as telogens having from one to eight hydroxyl groups and from 1 to 18 carbon atoms to give linear or branched chain polyoxyethylene polyols. For exampe, the adduct of butane diol will contain 1 butane diol unit and from 15 to 100 ethylene oxide units. Of course, not all of the OH groups on the diol, triol, pentol, etc. need to be ethoxylated so long as the polyoxyethylene compound contains the requisite number of ethylene oxide units. If desired, the polyols can then be end-blocked by reacting with methyl sulfate, ethyl sulfate and the like to provide alkoxide or phenoxide groups on the ends of the chain instead of hydroxyl groups. Still other methods can be used for making the polyoxyethylene compounds. However, it is reasonable that as technology advances, other polyoxyalkyene compounds not precisely within the scope of this formula but of equivalent utility in carrying out the new techniques of the invention will become available. As has been indicated, the polyoxyalkylene compound in order to produce effective results should contain at least 15 oxyethylene units. This reagent may be in the form of a glycol or polyol in which the ends are hydroxyl groups or as ethers in which at least one of the hydrogen atoms has been replaced by an alkyl group advantageously having between 1 and 10 carbon atoms or an aryl group containing between 6 and 18 carbon atoms. Another criteria for the polyoxyalkylene compound is that it shall be water-soluble, namely, possess a solubility in water at about 10 to 30° C. of at least 1 gram per 100 grams of water. A wide variety of such materials are commercially available being widely employed as surfactants. A selected list of polyoxyalkylene compounds usable in carrying out the new techniques includes:

Polyethylene glycols having 15 to 100 oxyethylene units.
Oxyethylated alkanols, e.g., "Plurafac A–24," "Plurafac RA–40," etc.

Nonyl phenyl ether polyethylene glycols, e.g., "Dowfax 9N20," "Igepal CO990," etc.
Monomethyl ether of polyethylene glycol, e.g., "Methoxycarbowax 750."
Alkanol ethylene oxide adducts, e.g., "Surfonic LR–74."
Octyl phenol polyglycol ether, e.g., "Sterling OP–125."

The new polymerization procedures are contemplated for use in the production of ethylene and vinyl acetate copolymers of any desired proportions. However, the procedures are particularly effective in the production of ethylene-vinyl acetate copolymers containing from about 10 to 25 parts by weight of ethylene and from 75 to 90 parts by weight of vinyl acetate. These basic copolymers, on the other hand, may be modified by the incorporation of additional copolymerizable materials in an amount advantageously between about 0.1 to 10 parts by weight of added copolymerizable material for each 100 parts by weight of monomer mixture. For example, where the polymer emulsions resulting from the new procedures are to be used in the formation of interior or exterior paint, the inclusion of a small amount of acrylic acid as a copolymerized material serves to improve the freeze-thaw stability of the polymer latex. Inclusion of other unsaturated monocarboxylic acid copolymerizable materials may also be used for this purpose or to improve the adhesive qualities of the polymers to substrates or the like. A selected list of copolymerizable materials which may be used in this manner in the formation of polymers in accordance with the invention include:

| | |
|---|---|
| vinyl chloride, | sodium vinyl sulfonate, |
| methyl acrylate, | 2-sulfo ethyl methacrylate, |
| ethyl methacrylate, | itaconic acid, |
| vinylidene chloride, | monoethyl maleate, |
| vinyl fluoride, | monoethyl fumarate, |
| fumaric acid, | dibutyl maleate, |
| methacrylic acid, | acrylonitrile, |
| chloroacrylic acid, | methacrylonitrile, and |
| hydroxy ethyl acrylate, | acrylamide. |
| hydroxy ethyl methacrylate, | |

The new methods for improving molecular weight and tensile strength of vinyl acetate-ethylene copolymers is contemplated for any known general method of producing such copolymers. However, it is preferred to use these improvements in the formation of polymers by procedures in which the monomer material is polymerized while dispersed as a discontinuous phase in an aqueous medium constituting the continuous phase of the polymerization system. Such operations include the so-called suspension and emulsion polymerizations. The new operations are most advantageously employed in connection with emulsion polymerizations in which the resulting polymer is obtained as a stable emulsion or latex.

Advantageously, some suitable form of catalyst will be employed to aid in the polymerization and the action of the catalyst may be further modified by so-called accelerators, promoters, telogens and the like. Advantageously, the catalyst is dissolved or suspended in the aqueous medium constituting the continuous phase of the polymerization system and in addition to the catalyst, the aqueous phase may also include a dispersing or emulsifying agent, a protective colloid and similar adjuvants known to the art in conducting such aqueous phase polymerizations. Advantageously, the polymerization catalyst will be a peroxygen compound and the emulsifying agent will be an ionic surfactant. A feature of the present invention is the use of low pressures so that conventional polymerization reactors may be used and the employment of high pressure equipment is avoided. However, pressures somewhat in excess of 760 mm. Hg may be used. It, also, is desirable to polymerize at low temperatures to avoid reduction in molecular weights when fast catalyst systems are employed.

Examples of materials which may advantageously be used as polymerization catalysts include:
alkali metal persulfates, e.g., sodium or potassium,
alkali metal peroxides,
alkali metal perborates,
peracetic acid,
perphthalic acid,
barium peroxide,
benzoyl peroxide,
lauryl peroxide,
butyl hydroperoxide,
benzoyl acetyl peroxide, and
2,2'-azobisisobutyronitrile.

Examples of materials which may advantageously be used as emulsifying or dispersing agents in conducting the new polymerizations include: sodium lauryl sulfate, sulfated castor oil, sodium salt of alkyl polyphosphoric acid ester, triethanolamine dodecyl benzene sulfonate, sodium dioctyl sulfonsuccinate, ammonium lauryl sulfate, sodium myristyl ether sulfate, oleic imidazoline, and sodium dodecyl benzene sulfonate. The emulsifying agents should provide a pH of from 4 to 6 in the aqueous media and should not hydrolyze the vinyl acetate in which case they may have to be buffered.

The new interpolymers of ethylene and vinyl acetate of increased molecular weight and tensile strength produced by the invention may be used for any purpose for which prior known ethylene-vinyl acetate copolymers have been known to be useful. Since in the preferred embodiments of the inventions, the polymer products are obtained as stable emulsions or latices, they are useful in the making of paints for exterior or interior use. When modified by inclusion of small amounts, e.g., about 0.1 to 1.5 parts by weight of acrylic acid per 100 parts by weight of monomer mixture, the resulting latices exhibit excellent freeze-thaw stability and films formed from the copolymers possess good water resistance and freedom from discoloration on heating. In forming latex paints, the new copolymers may be included in formulations containing resin extenders and they possess good compatibility with the usual paint pigments including titanium dioxide, calcium silicate, barium sulfate and the like.

Another use to which the new copolymers may be placed is in the coating of paper and textiles. Inclusion of various polar groups by copolymerization of minor quantities of polar group containing monomers as mentioned above are useful in making such coating compositions. Such polar groups may include the carboxyl, amide, hydroxyl and sulfonate groups. Coating compositions of this type may include water-soluble additives to aid in obtaining high pigment loading. Using appropriate amounts of clay and copolymer in conventional paper coating techniques, papers having slick finishes can be obtained. In the coating or other treatment of textiles, the new copolymer latices may be used in forming non-woven fabrics, producing upholstery backing and the like.

Another major category of use of the new copolymers is as adhesives to secure paper, textile, plasticized polyvinyl chloride or other plastic sheets to cloth, metal foil, metal sheets, galvanized steel, wood, paperboard and the like. Further adhesive uses would include production of plywood, book binding, paper saturation, production of boots and shoes and as an adhesive in combing polyurethane or other plastic foam scraps.

The new interpolymers of the invention may be used as dry polymers instead of as aqueous emulsions or dispersions. As such, they are employable as plasticizers or extender resins for various plastics, including polyvinyl chloride, styrene-acrylonitrile polymers, polystyrene, nitrocellulose and the like, or in the production of caulking compounds and sealants. Further, they may be at least partially hydrolyzed to polymer materials containing polyvinyl alcohol components. Such hydrolyzed products find use in the formation of polyurethane foams and coatings, thermosetting coatings with aminoplasts, as shellac substitutes, and as paper coating resins.

In carrying out the progressive addition of at least one of the major monomer materials from the monomer mixture used in the polymerization, namely, ethylene or vinyl acetate, the progressive addition may be accomplished in a continuous streamline fashion or in separated increments. The rate of the progressive introduction of one or more of the components of the monomer mixture may be varied, dependent in part upon the temperature or other reaction conditions, upon the activity of the catalyst employed, and the like. It has been found effective to proportion the rate of introduction of at least one of the major monomers so that the quantity of that monomer at any given time during the polymerization relative to the total quantity of that monomer used in the entire process does not exceed by 50% the ratio of time at the given period of the polymerization to the total time of polymerization. Most advantageous results are obtained when the introduction of the polyoxyethylene compound is similarly proportioned. Preferably, this is accomplished by mixing the polyoxyethylene compound with the vinyl acetate so that its introduction to the polymerization system proceeds simultaneously with the progressive introduction of the vinyl acetate. Advantageous results are obtained by the method of the present invention when operating at the low temperatures disclosed herein using a redox catalyst system for polymerization such as potassium persulfate and sodium formaldehydesulfoxylate, tertiary butyl hydroperoxide and sodium thiosulfate, and other redox catalysts and at relatively low pressures during polymerization in the reactor of from about 150 to 400 p.s.i.g.

The embodiments of the invention in which an exclusive property or privilege is claimed are defined as follows:

1. A method for the copolymerization of ethylene and vinyl acetate to produce polymer products of high molecular weight and improved tensile strength which comprises:
   (a) polymerizing a monomer mixture of ethylene and vinyl acetate as a disperse phase in an aqueous medium wherein at least one of the components ethylene or vinyl acetate is introduced into the aqueous medium progressively as the polymerization proceeds, and
   (b) including as a component of the monomer mixture a minor amount of a water-soluble polyoxyethylene compound by progressive addition as the polymerization proceeds,
   (c) said polyoxyethylene compound having from 2 to 8 terminal —OR groups wherein R is hydrogen, C1 to C10 alkyl or C6 to C18 aryl, and from 15 to 100 oxyethylene units.

2. A method as claimed in claim 1 wherein the amount of polyoxyethylene compound used is between about 1 to 5 parts by weight per 100 parts total weight of ethylene and vinyl acetate.

3. A method as claimed in claim 1 wherein the monomer mixture contains from about 25 to 10 parts by weight of ethylene and from 75 to 90 parts by weight of vinyl acetate.

4. A method as claimed in claim 1 wherein the monomer mixture contains additionally from about 0.1 to 10 parts by weight, for each 100 parts by weight of said monomer mixture, of a low molecular weight copolymerizable monomer, other than said ethylene and said vinyl acetate, having one ethylenic double bond and having less than 15 carbon atoms.

5. A method as claimed in claim 1 wherein the monomer mixture comprises up to about 2 parts by weight of copolymerizable unsaturated carboxylic acid monomer for each 100 parts by weight of monomer mixture.

6. A method as claimed in claim 5 wherein said acid monomer is acrylic acid which is present in amount of from about 0.1 and 1.5 parts by weight for each 100 parts by weight of monomer mixture.

7. A method as claimed in claim 1 wherein the polyoxyethylene compound is polyethylene glycol containing 15 to 30 oxyethylene units.

8. A method as claimed in claim 7 wherein the polyethylene glycol is introduced into the aqueous medium as a mixture with at least a portion of the vinyl acetate used in the polymerization, said portion being added to the aqueous medium which is maintained under an atmosphere of ethylene at a pressure in excess of 760 mm. Hg.

9. A method as claimed in claim 1 wherein said aqueous medium is a solution of a peroxygen polymerization catalyst and an ionic emulsifying agent.

10. A method as claimed in claim 1 wherein the polymerization is conducted at a temperature of from about 1 to 50° C. for between about 5 to 10 hours.

11. The method as claimed in claim 1 wherein a redox catalyst system is used and polymerization is conducted at a pressure of from about 150 to 400 p.s.i.g. and at a temperature of from about 1 to 50° C.

12. An interpolymer of ethylene and vinyl acetate comprising between about 10 to 25 parts by weight of ethylene for each 75 to 90 parts by weight of vinyl acetate and between about 1 to 5 parts by weight per 100 parts total combined weight of ethylene and vinyl acetate of a polyoxyethylene compound having from 2 to 8 terminal —OR groups, wherein R is hydrogen, C1 to C10 alkyl or C6 to C18 aryl and from 15 to 100 oxyethylene units, said interpolymer comprising cross-linkages to the extent that it possesses a gel content of at least 25%, the inherent viscosity of the portion of the interpolymer that is soluble in methyl ethyl ketone being at least 1.0 when measured as a 1% solution in methyl ethyl ketone.

13. An interpolymer as claimed in claim 12 which contains up to 10 parts by weight for each 100 parts of interpolymer of copolymerized unsaturated carboxylic acid.

14. An interpolymer as claimed in claim 12 which contains up to 2 parts by weight of acrylic acid for each 100 parts of interpolymer.

References Cited

UNITED STATES PATENTS

| 2,703,794 | 3/1955 | Roedel | 260—87.3 |
| 3,215,678 | 11/1965 | Adelman | 260—80.5 |
| 3,226,352 | 12/1965 | Helin et al. | 260—29.6 |
| 3,296,170 | 1/1967 | Burkhart et al. | 260—29.6 |

FOREIGN PATENTS

| 1,102,746 | 2/1968 | Great Britain. |
| 1,223,557 | 3/1966 | Germany. |

JOSEPH L. SCHOFER, Primary Examiner

S. M. LEVIN, Assistant Examiner

U.S. Cl. X.R.

117—130, 138.8, 139.5, 148, 152; 161—270; 260—41, 78.5, 80.73, 80.75, 80.81, 87.3